United States Patent Office 3,428,347
Patented Feb. 18, 1969

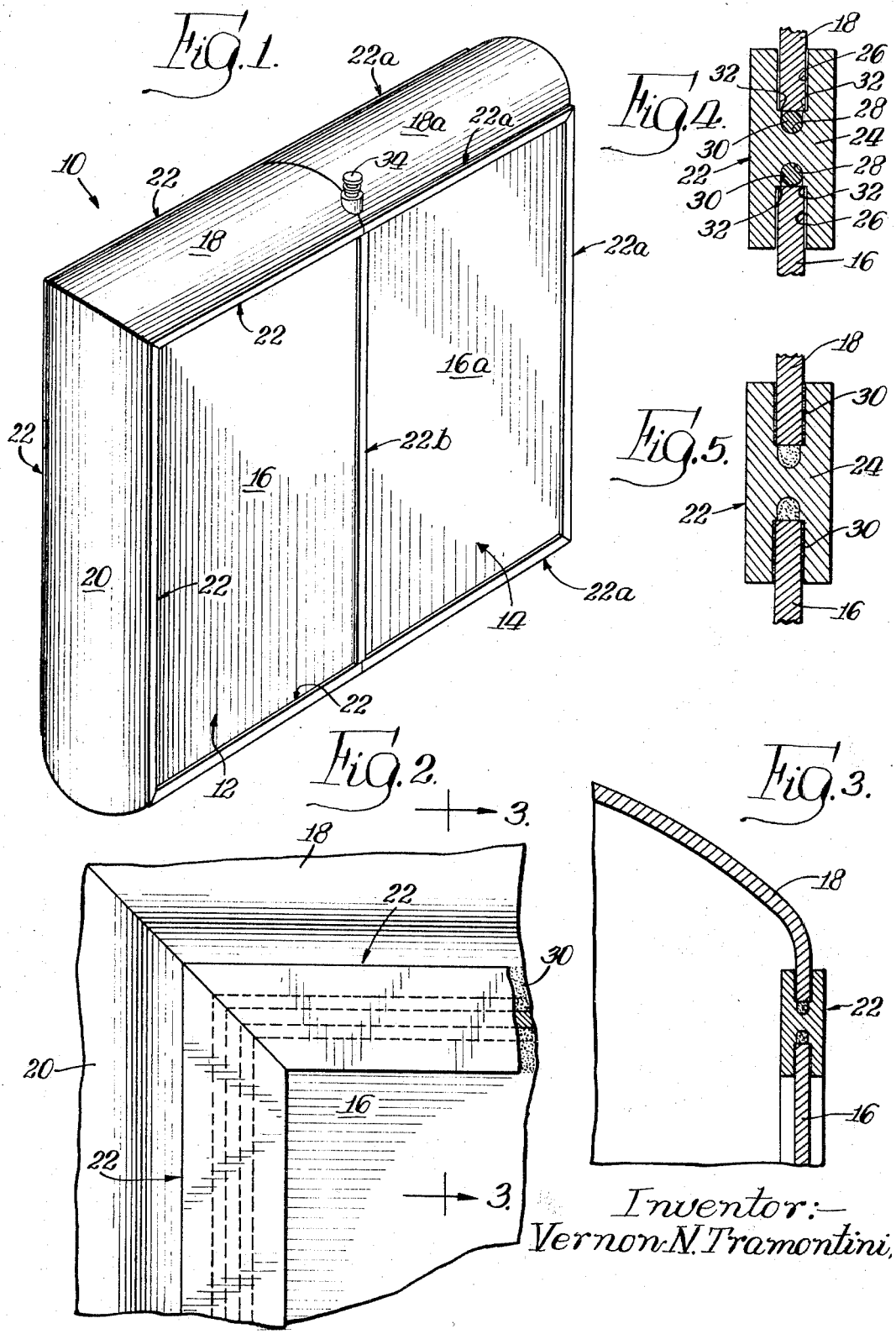

3,428,347
TRANSITION BAR
Vernon N. Tramontini, Indianapolis, Ind., assignor to Stewart-Warner Corporation, Chicago, Ill., a corporation of Virginia
Filed Nov. 17, 1966, Ser. No. 595,243
U.S. Cl. 287—189.36          4 Claims
Int. Cl. F16b 11/00, 5/08

ABSTRACT OF THE DISCLOSURE

A transition bar including a body portion having formed in the sides thereof two lengthwise recesses in which the edge portions of two members to be joined are adapted to be disposed and brazed. The body portion has formed therein along the bottoms of the recesses lengthwise channels in which strips of brazing material are adapted to be disposed prior to assembly. The channels have a width less than the width of the recesses whereby shoulders are presented for positively seating the edge portions of the members to be joined.

---

The present invention relates generally to a transition bar adapated for use in interconnecting the adjacent edge portions of two members.

Metallic parts or members are commonly joined by the technique of brazing. For example, in the fabrication of storage tanks and the like, the adjacent edge portions of component wall members are frequently united in a brazing operation. In such circumstances, one edge portion is lapped over the other edge portion, and the lapped portions are brazed together. Because of the single-lap relationship, the brazed joint thus formed has limited strength in tension. This unfavorable condition has tended to restrict the use of brazed joints in certain applications.

It is an object of the present invention to provide a novel form of transition bar by means of which a brazed joint having improved strength in tension may be established along the adjacent edge portions of two members. In this respect, the transition bar of the present invention comprises a body portion having formed in the sides thereof two lengthwise recesses in which the edge portions of the two members to be joined are disposed and brazed. With this arrangement, the edge portions are overlapped on both sides by the transition bar, and the resultant compound double-lap brazed joint has high strength in tension.

It is another object of the present invention to provide a transition bar, as described, which locates the required brazing material uniformly along the length thereof during assembly of the transition bar and members to be joined. In this connection, the body portion of the transition bar has formed therein along the bottoms of the recesses lengthwise channels in which strips of brazing material or wire are adapated to be disposed prior to assembly. During the brazing operation, the brazing material becomes molten and flows from the channels into the recesses about the edge portions to form therewith a brazed joint.

It is a feature of the present invention that the width of the channels in the transition bar is less than the width of the recesses whereby the body portion presents shoulders for positively seating the edge portions of the members to be joined.

Now in order to acquaint those skilled in the art with the manner of constructing and using transition bars in accordance with the principles of the present invention, there will be described in connection with the accompanying drawing a preferred embodiment of the invention.

In the drawing:

FIGURE 1 is a perspective view of an illustrative tank incorporating transition bars of the present invention;

FIGURE 2 is a fragmentary front elevational view, on an enlarged scale, of one corner of the tank of FIGURE 1;

FIGURE 3 is a sectional view, taken substantially along the line 3—3 in FIGURE 2, looking in the direction indicated by the arrows;

FIGURE 4 is a sectional view, on a further enlarged scale, corresponding generally to FIGURE 3, but showing the parts prior to brazing; and FIGURE 5 is a sectional view corresponding generally to FIGURE 4, but showing the parts subsequent to brazing.

Referring now to FIGURE 1, there is indicated generally by the reference numeral 10 a rectangular cryogenic tank or the like which may, for example, be composed of two modules or sections 12 and 14.

The module 12 is comprised of a front panel or wall portion 16, a corresponding back panel or wall portion (not shown), a formed top wall portion 18, a corresponding bottom wall portion (not shown), and a formed end wall portion 20. The top, bottom and end wall portions extend between and along three edges of the front and back wall portions, and the adjacent edge portions of these members are interconnected by elongated transition bar members 22 as shown for example in FIGURES 2 and 3. The resultant module presents one open end.

Each transition bar member 22, as shown for example in FIGURE 4, is comprised of a body portion 24 having formed in the opposed sides thereof two lengthwise recesses 26 which are respectively adapted to receive the edge portions of two adjacent members. In addition, the body portion 24 has formed therein along the bottoms of the recesses 26 lengthwise channels 28 which are adapted to receive strips of brazing material 30 preferably in the form of wire. The width of the channels 28 is less than the width of the recesses 26 whereby the body portion 24 presents shoulders 32 against which the edge portions of the two members received in the recesses 26 are adapted to seat.

In the assembly of the module 12, strips of brazing wire 30 are laid in and along the full length of the channels 28 of the transition bar members 22, and the edge portions of the several wall portions are disposed in the recesses 26 and located against the seats 32. The abutting ends of the top, bottom and end wall portions at the two corners of the module are preferably welded together, and tack welding may be performed at spaced locations along the transition bar members to maintain the parts of the module in proper position prior to brazing.

The described assembly is then immersed in a fluxing salt bath in a furnace, and the brazing wire 30 is heated to proper brazing temperature. During the brazing operation, the brazing material becomes molten and flows from the channels 28 (FIGURE 4) into the recesses 26 to fill the free spaces between the walls of the recesses and the adjacent surfaces of the edge portions (FIGURE 5) to form therewith brazed joints. Finally, the assembly is removed from the salt bath, air cooled rapidly for heat treating and water quenched to aid in salt removal. At the completion of the brazing operation, some brazing salt or flux usually remains in the channels 28 of the transition bar members. To seal off such contaminates, the mitered ends of the transition bar members may be welded together, and the exposed ends thereof at the open side of the module welded closed.

The module 14 is assembled and fabricated in a brazing operation in the same manner as the module 12. Therefore, a detail description thereof is deemed unnecessary. Like reference numerals followed by the subscript letter *a* have been used to indicate those parts of the module 14 that are the same as or similar to the parts of the module 12.

In the final stages of tank assembly, the open ends of the modules 12 and 14 are placed together with the edge portions of the front and back panels being disposed in the recesses of median front and back transition bar members 22b which in cross section are identical to the transition bar members 22 and 22a. The abutting ends of the top wall portions 18–18a, and of the bottom wall portions, are secured together as by welding, while the transition bar members 22b are suitably brazed or otherwise welded in position. To complete the tank 10, a bellows filler neck 34 is disposed through the top wall portions 18 and 18a at the junction thereof and is suitably secured in position as by welding.

From the foregoing description, it will be appreciated that the channels 28 of the transition bars locate the required brazing wire uniformly along the length of the joint to be brazed, that the shoulders 32 positively seat and locate the edge portions of the members being joined, and that the edge portions are overlapped on both sides by the transition bar thereby providing a compound double-lap brazed joint having high strength in tension. Because the transition bar of the present invention is of uniform cross section throughout its length, it may be inexpensively produced by extrusion. It will be further appreciated that if desired the median transition bars 22b may be eliminated from the tank 10, and the abutting edges of the two front panels, and of the two back panels, suitably welded directly together. Moreover, if tank size and internal construction permits, the two modules may be pre-assembled together in final form and brazed throughout in one operation; or a complete tank may be formed in a single module. Although rectilinear transition bars incorporated in a rectangular tank are disclosed herein, the transition bar of the present invention may also be arranged in arcuate or ring form for use in establishing a brazed joint between adjacent open ends of two cylindrical vessels.

While there has been shown and described a preferred embodiment of the present invention, it will be understood by those skilled in the art that various rearrangements and modifications may be made therein without departing from the spirit and scope of the invention.

I claim:
1. In combination, two wall members having an edge portion, an elongated transition bar comprising a body portion having formed in the sides thereof two lengthwise recesses in which are respectively disposed said edge portions, said edge portions being secured in said recesses by brazing, and said body portion of said transition bar having formed therein along the bottoms of said recesses lengthwise channels in which brazing material is adapted to be located prior to brazing of said edge portions in said recesses, the width of said channels being less than the width of said recesses whereby said body portion presents shoulders against said edge portions are located.

2. In combination, two wall members each having an edge portion, an elongated transition bar comprising a body portion having formed in the opposed sides thereof two lengthwise recesses in which are respectively disposed said edge portions, said edge portions being secured in said recesses by brazing, said body portion of said transition bar having formed therein along the bottoms of said recesses lengthwise channels in which brazing material is adapted to be located prior to brazing of said edge portions in said recesses, said channels having a width less than the width of said recesses whereby said body portion presents shoulders against which said edge portions seat, and said edge portions and said recesses and said channels being rectilinear.

3. In combination, at least one wall member having an edge portion, an elongated body member having formed in at least one side thereof a lengthwise recess in which is respectively disposed said edge portion, said edge portion being secured in said recess by brazing, and said body portion of said body member having formed therein along the bottom of said recess a lengthwise channel in which brazing material is adapted to be located prior to brazing of said edge portion in said recesses, the width of said channel being less than the width of said recess whereby said body member presents a shoulder against which said edge portion is located.

4. An assembly for fabricating a brazed joint comprising at least one wall member having an edge portion, an elongated body member having formed in at least one side thereof a lengthwise recess in which is respectively disposed said edge portion, said body member having formed therein along the bottom of said recess a lengthwise channel, the width of said channel being less than the width of said recess whereby said body member presents a shoulder against which said edge portion is located, and a wire of brazing material in said channel.

References Cited

UNITED STATES PATENTS

| 396,013   | 1/1889  | Thomson.            |
|-----------|---------|---------------------|
| 776,737   | 12/1904 | Greenfield 29—501   |
| 1,688,980 | 10/1928 | Miller.             |
| 1,735,809 | 11/1929 | Tebyrica.           |
| 2,050,728 | 8/1936  | Ost 29—501          |

EDWARD C. ALLEN, *Primary Examiner.*